United States Patent [19]
Seki et al.

[11] Patent Number: 5,095,439
[45] Date of Patent: Mar. 10, 1992

[54] PROFILE REVISING METHOD

[75] Inventors: Masaki Seki; Takashi Takegahara, both of Tokyo; Takeshi Arakaki, Yamanashi, all of Japan

[73] Assignee: Fanuc Ltd., Yamanashi, Japan

[21] Appl. No.: 368,305

[22] PCT Filed: Oct. 7, 1988

[86] PCT No.: PCT/JP88/01026
§ 371 Date: Jun. 13, 1989
§ 102(e) Date: Jun. 13, 1989

[87] PCT Pub. No.: WO89/03551
PCT Pub. Date: Apr. 20, 1989

[30] Foreign Application Priority Data
Oct. 15, 1987 [JP] Japan .................................. 260077

[51] Int. Cl.$^5$ ................................................ G06F 7/06
[52] U.S. Cl. ............................ 364/474.24; 364/474.24; 364/192
[58] Field of Search ........... 364/474.24, 474.26, 364/474.22, 192, 514, 518, 474.25, 191; 340/710,

[56] References Cited
U.S. PATENT DOCUMENTS

| | | | |
|---|---|---|---|
| 4,556,83 | 12/1985 | Kishi et al. | 364/474.25 |
| 4,546,434 | 10/1985 | Gioello | 364/192 |
| 4,556,957 | 12/1985 | Ichikawa | 364/474.25 |
| 4,618,924 | 10/1986 | Hinds | 364/474.25 |
| 4,697,249 | 9/1987 | Kishi et al. | 364/474.24 |
| 4,882,692 | 11/1989 | Saxton et al. | 364/518 |

Primary Examiner—Jerry Smith
Assistant Examiner—Patrick D. Muir
Attorney, Agent, or Firm—Staas & Halsey

[57] ABSTRACT

The method of the invention includes displaying on a display screen (CRT), a profile (A) and one or more figure elements (Sn, St, Ck) for specifying a shape added to the profile (A), designating a predetermined figure element (circular arc $C_1'$) of the profile (A) and designating the figure elements (Sn, St, Ck), which constitute the added shape, in order along a definition direction of the profile (A), and generating a new profile by connecting the added shape to the designated figure element (the circular arc $C_1'$) of the profile (A), and displaying the new profile on the display screen (CRT).

3 Claims, 7 Drawing Sheets

FIG. 2

SELECT SHAPE TO BE REVISED

SELECT ELEMENT TO BE REVISED

SELECT ELEMENT TO BE ADDED

PROFILE REVISING METHOD

BACKGROUND OF THE INVENTION

1. Field of the Invention

This invention relates to a method of revising a profile, and more particularly, to a profile revising method for revising a profile comprising specified figure elements such as points, straight lines and circles which are connected in order.

2. Description of the Related Art

In an automatic programming system for creating NC data using an automatic programming language such as APT (automatic programming tools) or FAPT, (a) a part program based on the automatic programming language is created by defining points, straight lines and circular arcs using simple symbols (this is referred to as "figure definition"), and then defining a tool path using the defined points, straight lines and circular arcs (referred to as "motion statement definition"), and (b) the part program based on the automatic programming language is subsequently converted into NC data comprising NC data (EIA codes or ISO codes) in a format capable of being executed by an NC unit.

For example, in the creation of a part program for moving a tool along a part profile A comprising straight lines and a circular arcs shown in FIG. 10($a$), figure definition is performed by defining straight lines $S_1$, $S_2$, $S_3$ and a circle $C_1$ [see FIG. 10($b$)] which are necessary for defining a part profile, as follows using a keyboard or tablet:

$$C_1 = x_0, y_0, r_0 \tag{1}$$

$$S_1 = x_1 \, X \tag{2}$$

$$S_2 = y_2 \, Y \tag{3}$$

$$S_3 = y_2 \, Y \tag{4}$$

$$P_1 = S_1, S_2 \tag{5}$$

In the foregoing, (1) signifies a circle of center $(x_0, y_0)$ and radius $r_0$;

(2) signifies a straight line parallel to the Y axis and having an X-intercept whose value is $x_1$;

(3) signifies a straight line parallel to the X axis and having a Y-intercept whose value is $y_1$;

(4) signifies a straight line parallel to the X axis and having a Y-intercept whose value is $y_2$; and (5) signifies the point of intersection between the straight lines $S_1$, $S_2$.

Thereafter, the figure elements (which are displayed on a CRT screen) are picked in clockwise or counterclockwise direction in order, e.g., $$P_1 \rightarrow S_2 \rightarrow C_1 \rightarrow S_3 \rightarrow S_1$$

(where, with regard to the circle $C_1$, a point on the circular arc $P_2 P_3$ is picked, with the clockwise direction serving as a reference), and the profile A [FIG. 10($a$)] is defined in the manner $$\begin{array}{l} P_1 \\ S_2, P_2 \\ C_1, SW, P_3 \\ S_3, P_4 \\ S_1 \end{array} \tag{6}$$

It should be noted that Eq. (6) signifies a shape up to the point $P_3$ clockwise along the circle $C_1$.

Thereafter, machining starting and end points, etc., of the profile A are designated by motion statement definition to define a tool path along which a tool is moved.

There are cases where figure elements $C_k'$, $S_n'$, $S_t'$ are added to a profile [e.g., profile A in FIG. 10($a$)], whose figure has already been defined, to modify the profile into a new profile A' shown in FIG. 11. In such cases, the prior art is such that each figure element must be redefined from the start and figure elements must be picked in order along the profile A' to specify the profile. As a result, a problem which arises is that the revising operation requires a great amount of time.

SUMMARY OF THE INVENTION

Accordingly, an object of the present invention is to provide a profile revising method through which a profile can be revised simply and quickly, as a result of which NC data obtained based on the defined profile can also be created simply and quickly.

Another object of the present invention is to provide a profile revising method through which new figure elements can be added to an already defined profile in a simple manner.

In accordance with the invention, the foregoing objects are attained by the steps of displaying, on a display screen, profile and one or more figure elements for specifying a shape added to the profile, a designating a predetermined figure element of the profile and designating the figure elements, which constitute the added shape, in order along a definition direction of the profile, and generating a new profile by connecting the added shape to the designated figure element of the profile, and displaying the new profile on the display screen.

BRIEF DESCRIPTION OF THE DRAWINGS

FIG. 2 is a top view illustrating the principal portion of a menu chart;

DETAILED DESCRIPTION OF THE PREFERRED EMBODIMENTS

Figure 1:
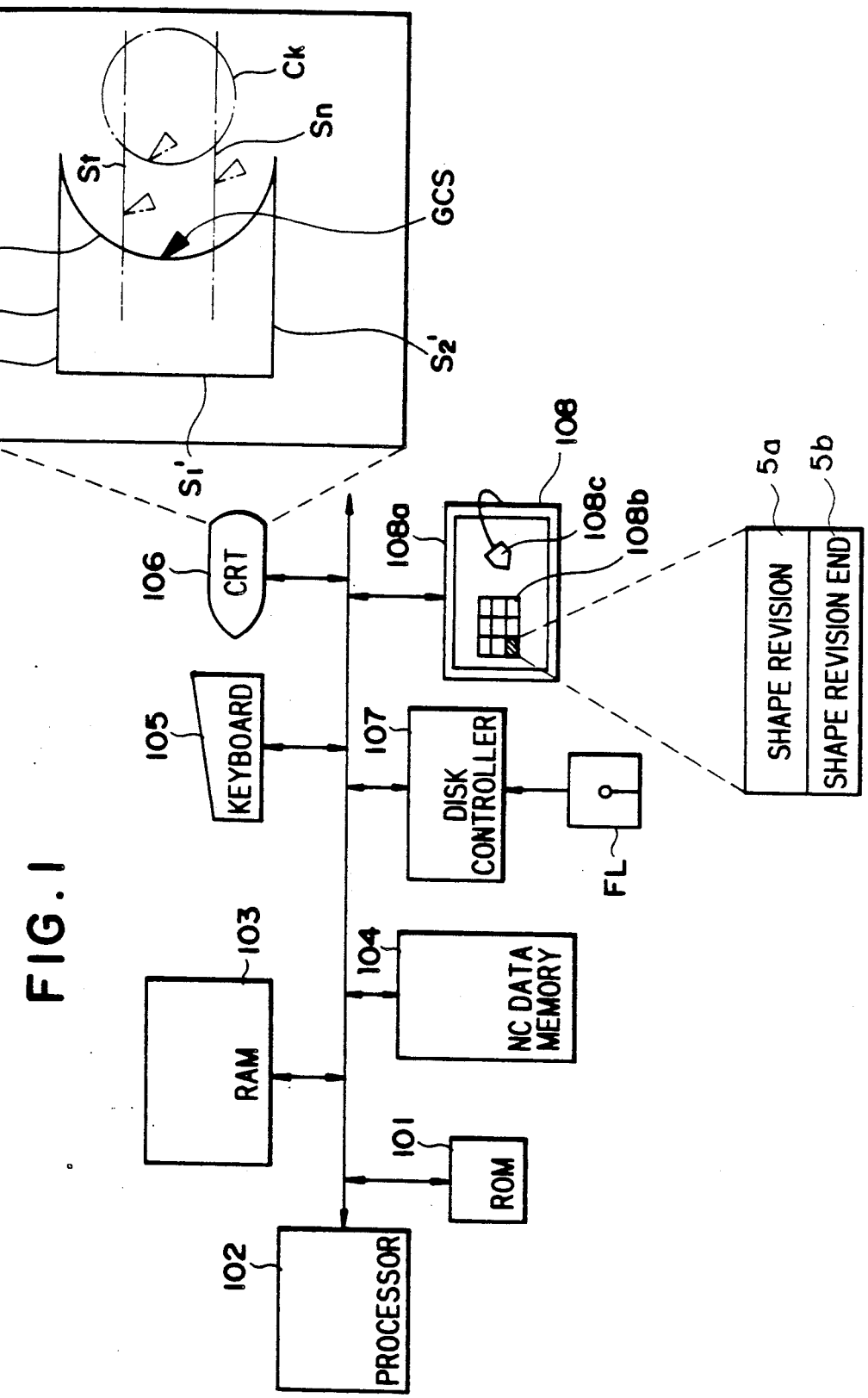
FIG. 1 is a block diagram of an apparatus for practicing the present invention.

FIG. 1 is a block diagram of an apparatus for practicing the present invention.

Numeral 101 denotes a ROM for storing a loading program and the like, 102 a processor for executing automatic programming processing, and 103 a RAM for storing a system program read in from a floppy FL, as well as various parameters and results of processing. Numeral 104 denotes an NC data memory for storing the finally created NC data having an executable format, 105 a keyboard, 106 a display unit (CRT), 107 a disc controller, and 108 a tablet device having a tablet surface 108a to which a menu chart 108b having menu items is affixed. Prescribed menu items are picked by a tablet cursor 108c. A graphic cursor GCS on a display screen is moved by moving the cursor 108a on the tablet surface. FL represents a floppy disc.

The CRT 106 displays a profile A which prevails prior to a revision, the profile being composed of straight lines $S_1'$, $S_2'$, $S_3'$ and circular arc $C_1'$, as indicated by the solid lines, as well as straight lines Sn, St and a circle Ck, indicated by the one-dot chain lines, which are figure elements for addition to the profile for the purpose of revising the same. It should be noted that it can be arranged so that the added figure elements are displayed as solid lines in a color different from that of the profile A.

Figure 2:
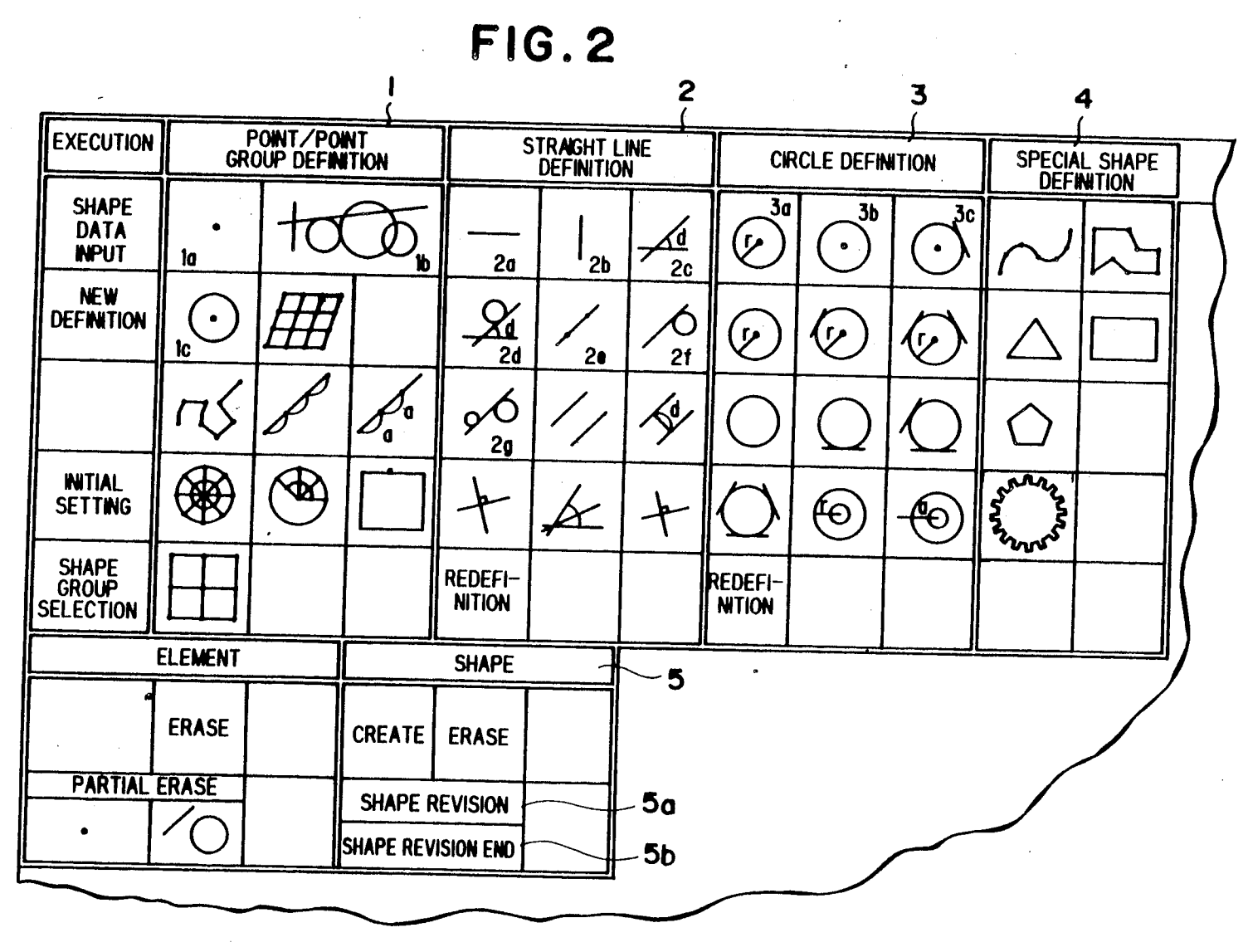

FIG. 2 is a view for describing the principal parts of the menu chart 108b. Numeral 1 is a "POINT/POINT GROUP DEFINITION" section, 2 a "STRAIGHT LINE DEFINITION" section, 3 a "CIRCLE DEFINITION" section, 4 a "SPECIAL SHAPE DEFINITION" section and 5 a "SHAPE ORIGINATION" section. The "SHAPE ORIGINATION" section 5 includes a "SHAPE REVISION" item 5a and a "SHAPE REVISION END" item 5b.

Figure 3:
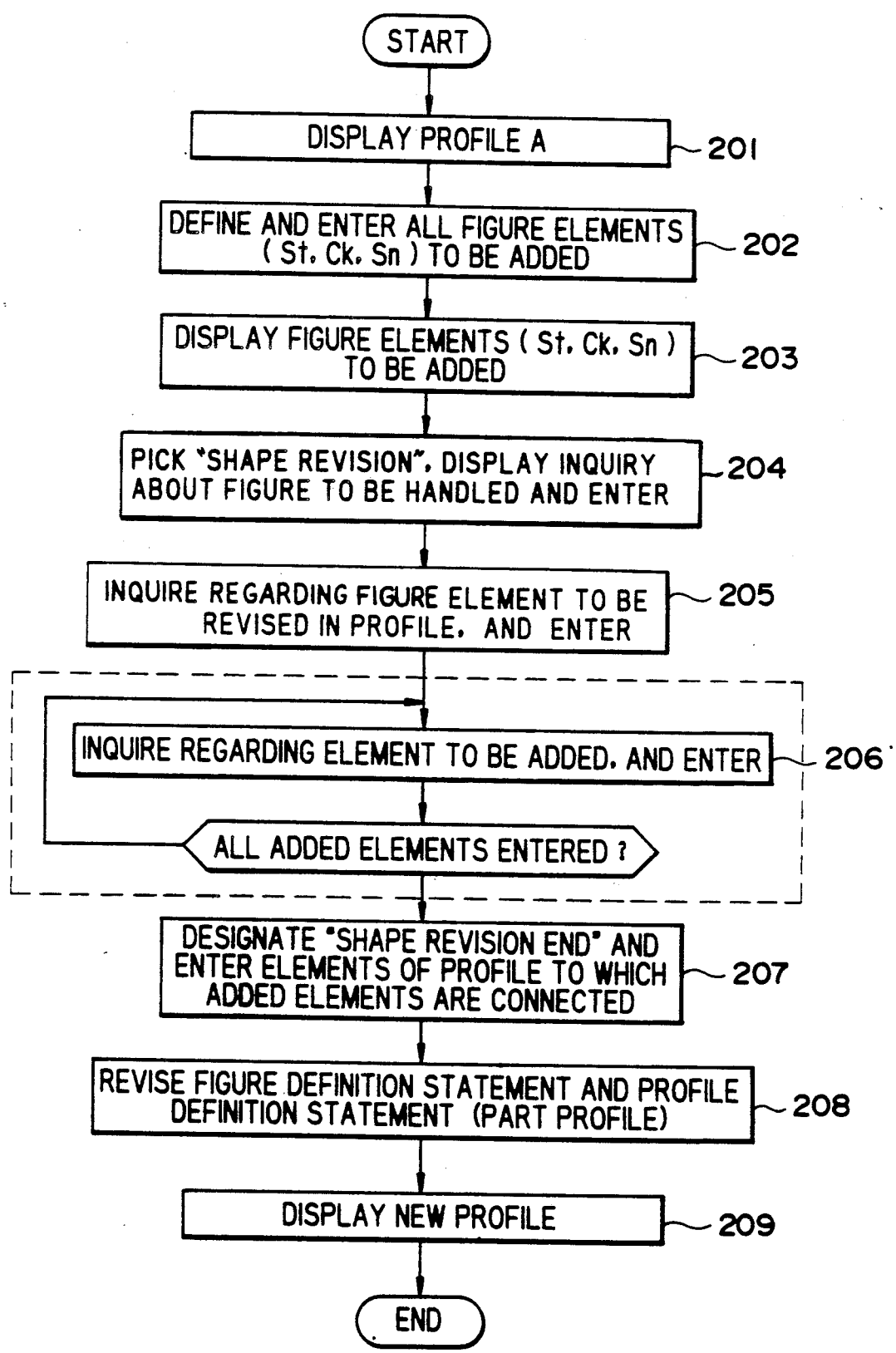
FIG. 3 is a flowchart of profile revision processing according to the invention.

FIG. 3 is a flowchart of profile revision processing according to the invention, and FIGS. 4 through 9 are views for describing profile revision processing. The profile revising method of the invention will now be described in accordance with FIGS. 3 through 9. It is assumed that the system program for creating the NC part program, parameters and the like have already been stored in the RAM 103 from the floppy disc FL.

Figure 4:
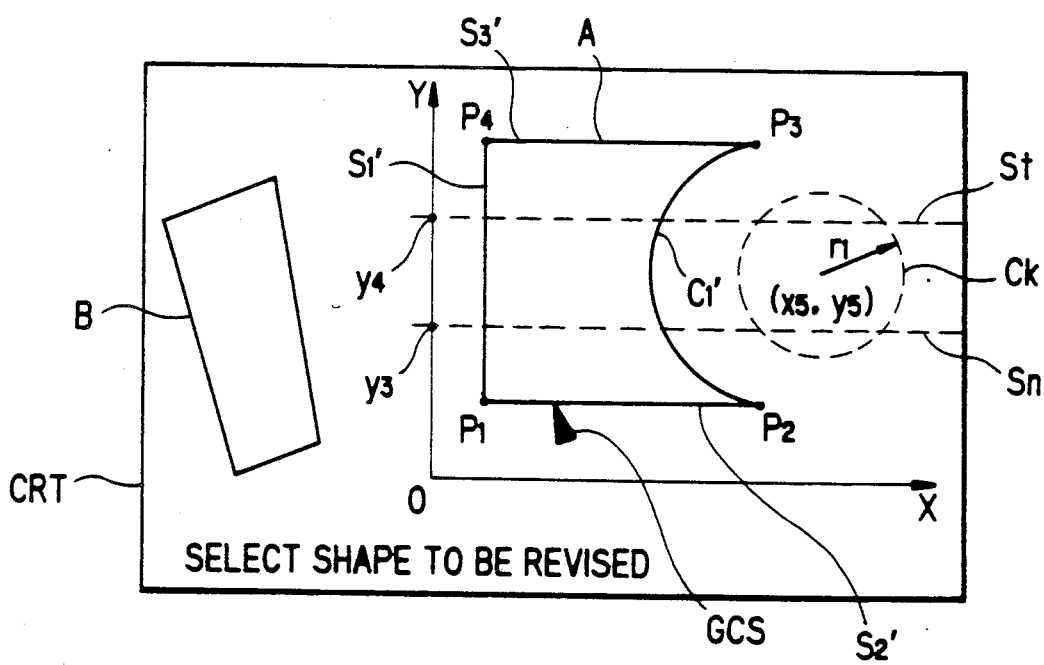
FIG. 4 is a view for describing figure elements constituting an added shape.
Figure 5:
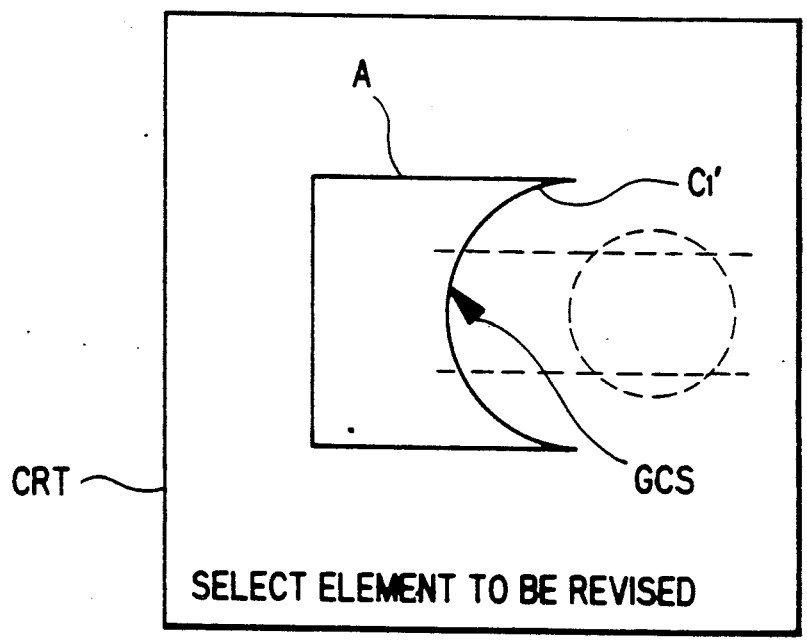
FIG. 5 is a schematic view for describing figure elements to be revised in a profile.

First, through a method similar to that of the prior art, the profile A comprising the straight lines $S_1'$, $S_2'$, $S_3'$ and circular arc $C_1'$ shown in FIG. 4, by way of example, is defined. As described above with regard to the prior art, the figure definition statements are as follows:

$$C_1 = x_0, y_0, r_0$$

$$S_1 = x_1 X$$

$$S_2 = y_2 Y$$

$$S_3 = y_2 Y$$

$$P_1 = S_1, S_2$$

The profile definition statement is as follows:
$P_1$
$S_2, P_2$
$C_1, CW, P_3$
$S_3, P_4$
$S_1$ The processor 102 stores the figure definition statements and profile definition statement in the RAM 103 and displays the profile on the CRT 106 (step 201).

Next, assume that the profile A is to be revised into a new profile by adding a shape composed of other figure elements, e.g., the circle Ck and straight lines Sn, St indicated by the dashed lines in FIG. 4, to the circular arc $C_1'$ of the profile A. In such case, the operator uses the tablet 108 or keyboard 105 to define and enter the figure elements Ck, Sn, St in the manner $$Ck = x_5, y_5, r_1$$

$$Sn = y_3 Y$$

$$St = y_4 Y$$

and display the same on the CRT 106 (steps 202, 203).

Next, when the operator picks the "SHAPE REVISION" item 5a from the tablet menu 108b, the processor 102 causes the CRT 106 to display the prompt "SELECT SHAPE TO BE REVISED". Accordingly, the operator positions the graphic cursor GCS on the profile A, for example, to specify the shape to be revised (step 204).

When the profile to be revised is specified, the processor 102 causes the CRT 106 to display the prompt "SELECT ELEMENT TO BE REVISED". In response, the operator positions the graphic cursor GCS on the circular arc $C_1'$ of the profile A to specify the figure element to be revised (step 205; see FIG. 5).

Figure 6:
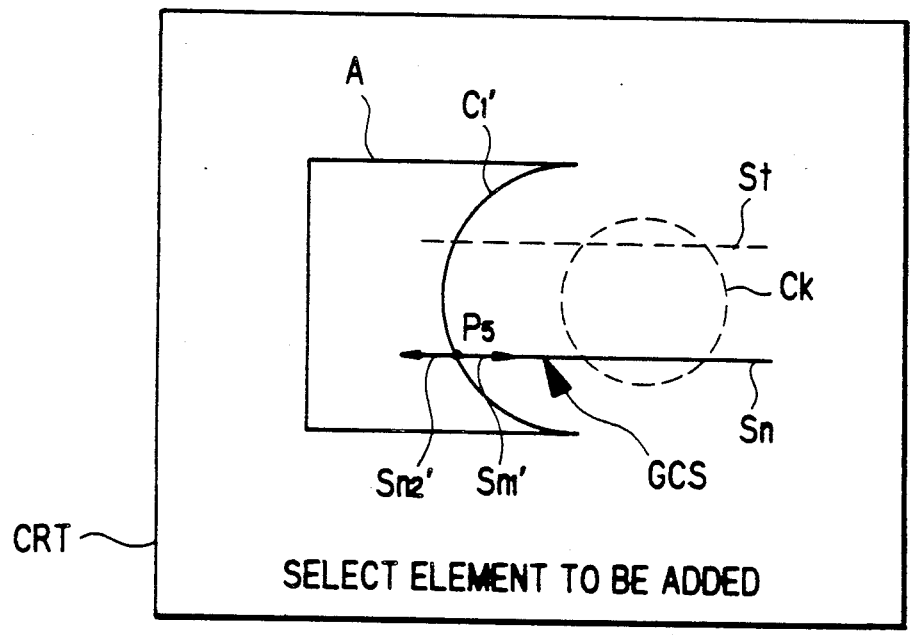
FIGS. 6 through 8 are schematic views for describing a method of designating an added shape.
Figure 7:
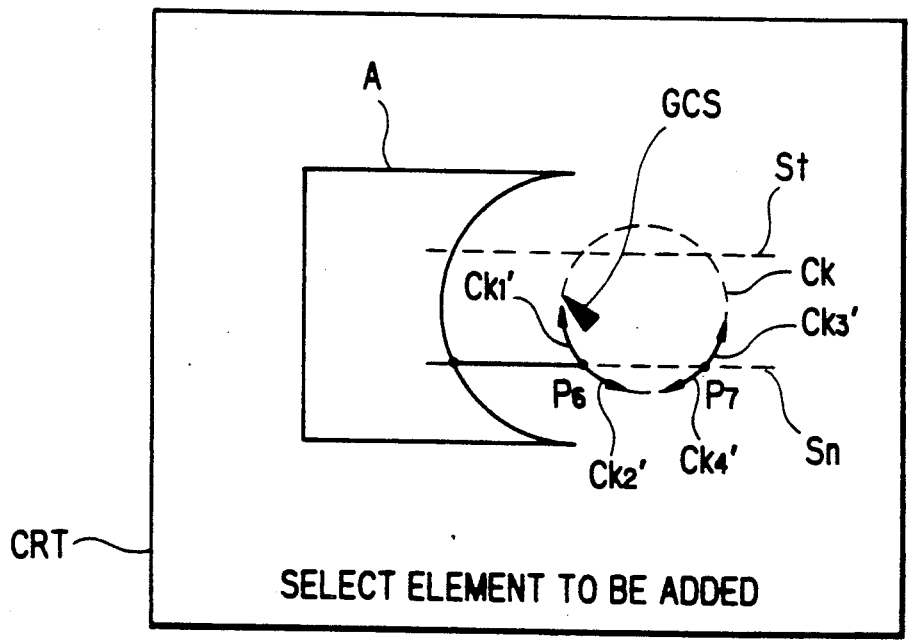
Figure 8:
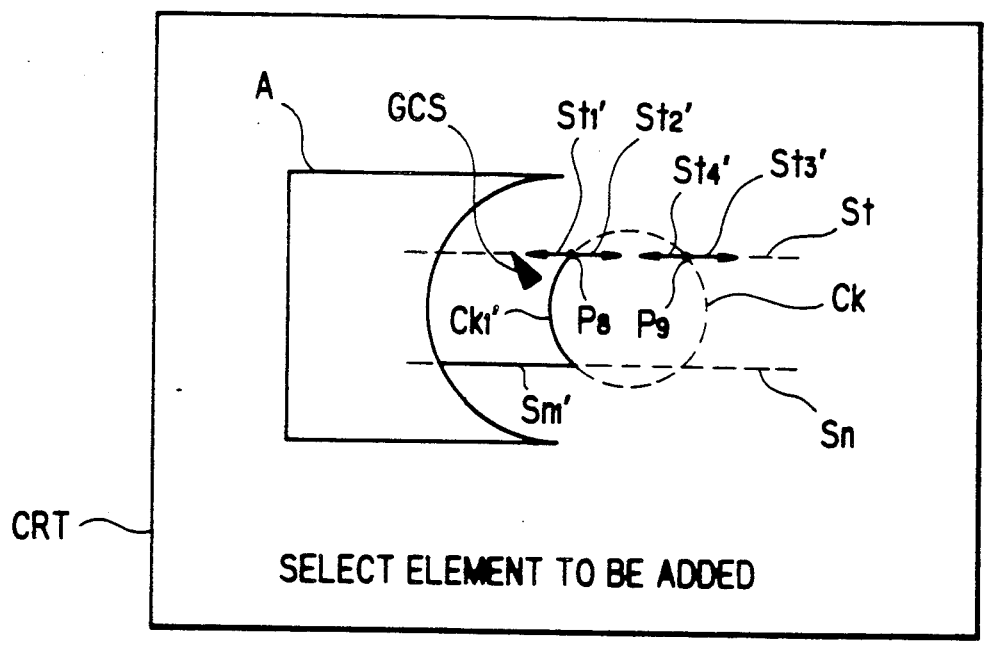

When the figure element to be revised has been specified, the processor 102 causes the CRT 106 to display the prompt "SELECT ELEMENT TO BE ADDED" (see FIG. 6). Accordingly, the operator selects the straight line Sn, which is a figure element similarly entered in advance. In this case, two directions are conceivable, namely the $Sn_1'$ direction and $Sn_2'$ direction relative to a boundary which is the point of intersection $P_5$ between the circular arc $C_1'$ and the figure element Sn. Therefore, the graphic cursor GCS is positioned on the figure element on the side of the selected direction (here the $Sn_1'$ direction) to pick this figure element. The straight line $Sn_1'$ is thus selected.

Next, the circle Ck, which is a figure element similarly entered in advance in response to the same prompt, is selected. In this case, there are two points of intersection between the circle Ck and the straight line Sn, namely $P_6$ and $P_7$ (see FIG. 7), and four circular arcs are conceivable, namely circular arcs $Ck_1'$, $Ck_2'$ in clockwise and counter-clockwise directions with point of intersection $P_6$ as the starting point, and circular arcs $Ck_3'$, $Ck_4'$ in clockwise and counter-clockwise directions with point of intersection $P_7$ as the starting point. Therefore, the graphic cursor GCS is positioned on the figure element near the starting point of the selected circular arc (here the arc $Ck_1'$) to pick the same. Thus, the circular arc $Ck_1'$ is selected.

Further, the straight line St, which is a figure element entered in advance in response to the same prompt, is selected. In this case, there are two points of intersection between the circle Ck and the straight line St, namely $P_8$ and $P_9$ (see FIG. 8), and points are conceivable on four straight lines, namely straight lines $St_1'$, $St_2'$ extending in left and right directions with point of intersection $P_8$ as the starting point, and straight lines $St_3'$, $St_4'$ extending in left and right directions with point of intersection $P_9$ as the starting point. Therefore, the graphic cursor GCS is positioned on the figure element near the starting point of the selected straight line (here the straight line $St_1'$) to pick the same. Thus, the straight line $St_1'$ extending in the left direction and having $P_8$ as its starting point is selected.

The foregoing is step 206.

Figure 9A:
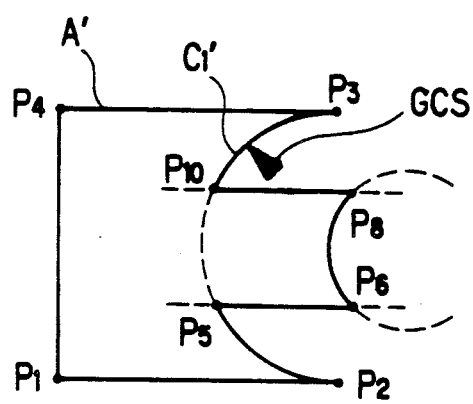
FIGS. 9($a$) and 9($b$) are views for describing a profile after revision.

If designation of all of the added figure elements has ended, the final step is to connect the figure element $St_1'$ to the profile A. That is, the "SHAPE REVISION END" item $5b$ is picked from the tablet menu table $108b$ and the graphic cursor GCS is then positioned on the figure element (here the circular arc $C_1'$) of profile A to which the figure element $St_1'$ is to be connected, thereby selecting this figure element (step 207). Owing to the foregoing revision operation, the processor 102 makes the figure definition statements as follows:

$C_1 = x_0, y_0, r_0$ $S_1 = x_1 X$ $S_2 = y_2 Y$ $S_3 = y_2 Y$ $C_k = x_5, y_5, r_1$ $S_n = y_3 Y$ $S_t = y_4 Y$ $P_1 = S_1, S_2$ and revises the profile definition statement as follows (step 208):
$P_1$
$S_2, P_2$
$C_1, CW, P_5$
$S_n, P_6$
$C_k, CW, P_8$
$S_t, P_{10}$
$C_1, CW, P_3$
$S_3, P_4$
$S_1$ The profile A is revised to a new profile A', which is displayed on the display screen CRT [step 209; FIG. 9(a)].

Figure 9B:
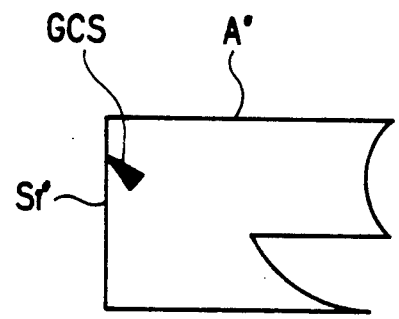
Figure 10A:
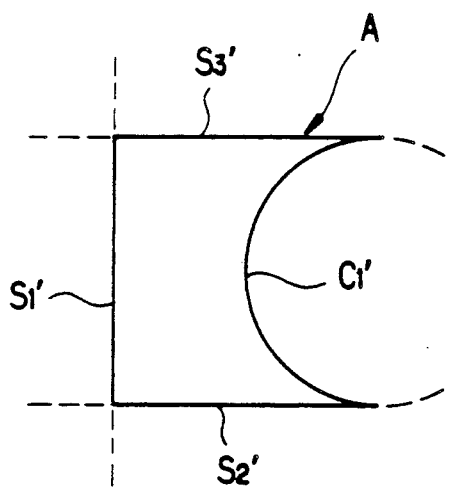
FIGS. 10($a$), 10($b$) and 11 are schematic views for describing an example of the prior art.
Figure 10B:
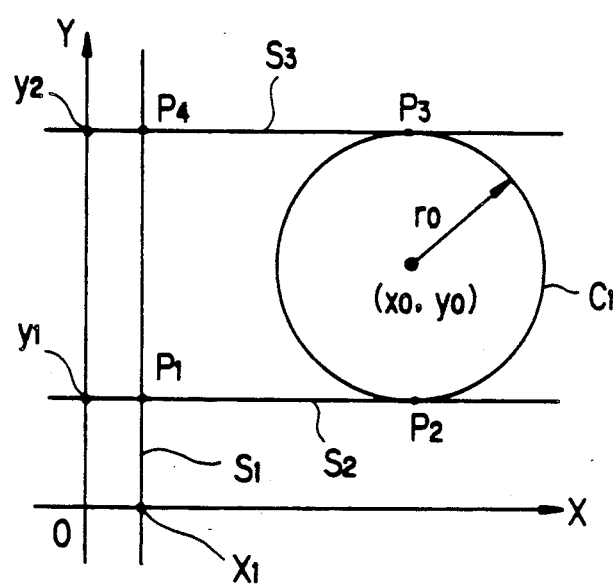
Figure 11:
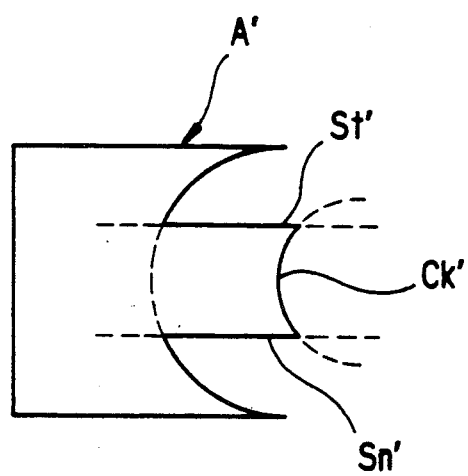

It should be noted that if the figure element connected to the profile A is picked as a straight line $S_1'$ after the "SHAPE REVISION END" item $5b$ is picked, the profile A will be modified to a new profile A" and display [see FIG. 9(b)].

To sum up the foregoing, figure elements constituting an added shape, as well as first and second figure elements (which may coincide in some cases) of the original profile to which the first and last figure elements of the added shape are connected, are specified, whereupon the figure definition statements of the figure elements constituting the added shape are added to the figure definition statements in the part program of the original profile, and the names of the figure elements of the added shape are inserted between the first and second figure elements in the profile definition statements of the part program, thereby generating a new profile part program. The profile is displayed on the CRT on the basis of this part program.

In accordance with the invention, it is arranged to display, on a display screen, a profile and one or more figure elements for specifying a shape added to the profile, designate a predetermined figure element of the profile and designate the figure elements, which constitute the added shape, in order along a definition direction of the profile, and generate a new profile by connecting the added shape to the designated figure element of the profile, and display the new profile on the display screen. Accordingly, a profile can be revised simply and quickly, as a result of which NC data obtained based on the defined profile can also be created simply and quickly.

We claim:

1. A profile revising method for revising a first profile comprising original figure elements specified by figure definition statements based on an automatic programming language, including points, straight lines and circles, connected in a specified direction in order in accordance with a designated sequence comprising the steps of:
   displaying, on a display screen, the first profile and one or more new figure elements for constituting an additional shape to said first profile;
   designating selected ones of the original figure elements to be revised in said first profile, and designating the new figure elements, which constitute said additional shape, in order along the specified direction of the first profile;
   generating a new second profile by connecting said additional shape to the designated selected ones of the original figure elements of said first profile;
   displaying said new second profile on the display screen; and
   using the second part program to machine a workpiece.

2. A profile revising method according to claim 1, wherein the original figure elements to be revised in said first profile are first and second original figure elements in the first profile to which are connected a first new figure element and a last new figure element constituting said additional shape.

3. A profile revising method according to claim 1, further comprising the steps of:
   storing a first part program as defined, the first part program including a figure definition statement of each original figure element constituting said first profile, and a profile definition statement which is said connection sequence;
   adding figure definition statements of the new figure elements constituting said additional shape to the figure definition statements of said first part program; and
   creating a new second part program of a new second profile by inserting, in a designated order, the new figure elements of the additional shape between said first and second original figure elements of the profile definition statement in the first part program.

* * * * *

UNITED STATES PATENT AND TRADEMARK OFFICE
CERTIFICATE OF CORRECTION

PATENT NO. : 5,095,439

DATED : March 10, 1992

INVENTOR(S) : Masaki Seki, et al.

It is certified that error appears in the above-identified patent and that said Letters Patent is hereby corrected as shown below:

Title PAGE: [56] References Cited, "4,556,83" should be --4,556,833--.

Col. 2, line 36, after "profile," delete --a--;

line 52, after "a" insert --schematic--; and line 58, after "are" insert --schematic--.

Signed and Sealed this

Twentieth Day of July, 1993

Attest:

MICHAEL K. KIRK

*Attesting Officer*  *Acting Commissioner of Patents and Trademarks*